Patented Dec. 9, 1947

2,432,310

UNITED STATES PATENT OFFICE 2,432,310

PREPARATION FOR COATING AND PRESERVING FRUITS AND VEGETABLES

Oliver P. Greenstreet, San Diego, Calif.

No Drawing. Application November 21, 1944,
Serial No. 564,551

4 Claims. (Cl. 99—168)

1

This invention relates to a preparation for preserving fruits and vegetables and has relation more particularly to a preparation of this kind which is adapted to be applied externally to the articles of fruit and vegetables.

It is an object of the invention to provide a preparation of this kind which causes fruits and vegetables to which it is applied to hold their natural color and which also serves to slow down the respiration and shrinkage of the fruits and vegetables with which it is used.

It is a further object of the invention to provide a preparation of this kind which provides means to retard mold or rot and to retain the natural flavor of the fruits or vegetables.

The preparation as herein embodied comprises a decoction of whole flaxseed, the same consisting of from 1/8 to 1/2 ounce by weight of whole flaxseed to 1/8 gallon of water and boiled for five minutes and then strained. Within the decoction is dissolved 12 to 20 ounces by weight of yellow dextrin, 4 to 8 ounces by weight of borax, and 1/8 to 1/2 ounce by weight of red rouge (watchmakers').

The resulting concoction is heated to substantially 212° F. To this heated concoction is added six pounds of paraffine melted and also at a temperature of 212° F.

After this resultant mixture has been cooled down to approximately 170° F., the same is poured into a mold and allowed to harden.

The flaxseed water and borax causes the dextrin and rouge to properly mix with the wax. The dextrin and rouge serve to close the cells of the fruits or vegetables to which the preparation is applied just enough to allow proper respiration, thus assuring the retaining of flavor and with the elimination of shrinkage.

The dextrin and rouge also hold the mixture to proper consistency which is very essential.

It is to be stated that with the paraffine slab now generally used in the coating of fruits and vegetables, such slab becomes very hard in cool or cold weather and very soft in warm or hot weather, resulting in either putting too much or not enough wax on the fruits or vegetables. My improved preparation eliminates all of these disadvantages. It is to be further stated that the paraffine serves to prevent the dextrin or rouge from cracking in all kinds of weather.

As is believed to be well known, the paraffine slab now in general use is approximately four inches wide, three inches deep, six feet long and weighs approximately seven pounds. The slab is placed under revolving round hair or bristle brushes to gather a sufficient amount of the slab to deposit the same on the fruits or vegetables and particularly oranges and grapefruit and which fruits or vegetables roll over the top brushes. This is a well known operation and with the present paraffine slab only a small part of the paraffine sticks to the fruits or vegetables.

2

With my improved preparation considerable more of the slab sticks to the fruits and vegetables and it has been proven in actual practice that the preparation as herein embodied slows down the loss of weight by approximately one-half, and retains a good shine for a considerable period of time.

When desired, the completed slab may be melted to such a consistency as will permit it to be applied hot to the fruits and vegetables in a very fine spray.

In referring to "paraffine" it is to be understood that this term as hereinbefore used and as stated in the claims is to include the use of many different equivalents, such as beeswax, spermaceti wax, opal wax, etc.

What is claimed is:

1. A preserving preparation for application to the surface of fruits and vegetables, consisting predominantly of wax having combined therewith a decoction comprising flaxseed water, dextrin, borax, and red rouge.

2. A preparation for addition to wax for use in coating fruits and vegetables, consisting of water containing the water soluble constituents of flax seed, together with dextrin, borax and red rouge.

3. A method of preparing a preservative composition for addition to wax to be used for coating fruits and vegetables, which consists in boiling in one pint of water, from 1/8 to 1/2 ounce of whole flax seed, then straining the flax seed from the liquid, then adding to the liquid 12 to 20 ounces by weight of dextrin, 4 to 8 ounces by weight of borax, and 1/8 to 1/2 ounce by weight of red rouge.

4. A preserving preparation for application to the surface of fruits and vegetables, consisting of paraffin wax having mixed proportionately with each six pounds thereof, approximately 16 ounces of water containing the water soluble constituents obtained by boiling for five minutes therein from 1/8 to 1/2 ounce by weight of whole flax seed, and from 12 to 20 ounces by weight of yellow dextrin, from 4 to 8 ounces by weight of borax, and from 1/8 to 1/2 ounce by weight of red rouge.

OLIVER P. GREENSTREET.

REFERENCES CITED

The following references are of record in the file of this patent:

UNITED STATES PATENTS

| Number | Name | Date |
|---|---|---|
| 524,008 | Walker, Jr. | Aug. 7, 1894 |
| 2,019,758 | MacRill | Nov. 5, 1935 |
| 2,213,557 | Tisdale et al. | Sept. 3, 1940 |
| 2,217,815 | Rector et al. | Oct. 15, 1940 |
| 2,332,128 | Blondon | Oct. 19, 1943 |
| 2,026,813 | Bizzell | Jan. 7, 1936 |